United States Patent

Schuh et al.

Patent Number: 6,031,767
Date of Patent: Feb. 29, 2000

[54] INTEGRATED CIRCUIT I/O INTERFACE THAT USES EXCESS DATA I/O PIN BANDWIDTH TO INPUT CONTROL SIGNALS OR OUTPUT STATUS INFORMATION

[75] Inventors: Brian J. Schuh; Christopher Philip Parker, both of Dutchess County, N.Y.; Vinay V. Shah, Hampshire, United Kingdom

[73] Assignee: International Business Machines Corporation, Armonk, N.Y.

[21] Appl. No.: 08/718,108

[22] Filed: Sep. 18, 1996

[51] Int. Cl.[7] .............................. G11C 19/00; G06F 13/00
[52] U.S. Cl. ................................ 365/189.05; 365/189.01; 710/71
[58] Field of Search ......................... 365/189.01, 189.05, 365/230.01, 230.08; 711/211; 395/891; 710/71

[56] References Cited

U.S. PATENT DOCUMENTS

| | | |
|---|---|---|
| 4,573,758 | 3/1986 | Hecker et al. . |
| 4,589,085 | 5/1986 | Pierce .................................. 364/754.01 |
| 4,656,620 | 4/1987 | Cox ......................................... 370/536 |
| 4,893,309 | 1/1990 | Lechner et al. . |
| 5,249,160 | 9/1993 | Wu et al. ........................... 365/230.08 |
| 5,303,201 | 4/1994 | Sakamoto ................................ 365/236 |
| 5,473,758 | 12/1995 | Allen et al. .............................. 711/103 |
| 5,530,965 | 6/1996 | Kawasaki et al. .................. 395/800.38 |
| 5,590,078 | 12/1996 | Chatter ................................ 365/189.01 |
| 5,680,567 | 10/1997 | Dent ........................................ 711/220 |
| 5,717,695 | 2/1998 | Manela et al. .......................... 714/718 |
| 5,721,708 | 2/1998 | Tsai et al. .......................... 365/230.02 |
| 5,808,957 | 9/1998 | Lee et al. ........................... 365/230.08 |
| 5,822,776 | 10/1998 | De Korte et al. ...................... 711/167 |

FOREIGN PATENT DOCUMENTS

WO 93/23812  11/1993  WIPO .

OTHER PUBLICATIONS

"Microsoft Press Computer Dictionary," 2nd ed., Microsoft Press, pp. 12–13, 95–96, 110, 1994.

*Primary Examiner*—Zarni Maung
*Assistant Examiner*—Andrew Caldwell
*Attorney, Agent, or Firm*—Whitham, Curtis & Whitham; H. Daniel Schnurmann

[57] ABSTRACT

An I/O interface for an integrated circuit (IC) is described that has a reduced number of I/O pins dedicated to providing control signals to or status information from the IC. In one embodiment, the IC comprises a plurality of input pins connected to logic for receiving and processing input data. The input pins have an input bandwidth greater than the logic's processing rate. If data and control signals are multiplexed onto the same input pin, the excess input pin bandwidth may used to transfer control signals into a plurality of latches within the IC. The I/O interface outputs a select signal that designates when an external device should drive the input pins with either data or control signals. In a specific embodiment, the logic comprises a parallel to serial converter and the control signal select conversion speed or encoding options. In another embodiment, the IC comprises a plurality of output pins connected to the output of a selector. Status latches and logic for outputting processed data drive the selector's inputs. The IC outputs a select signal that allows an external device to determine when the output pins are carrying processed data versus status information and thus demultiplex the signals. In a specific embodiment, the logic is a serial to parallel converter. Finally, both the input and output pin embodiments may used together in a single IC.

12 Claims, 4 Drawing Sheets

INTEGRATED CIRCUIT I/O INTERFACE THAT USES EXCESS DATA I/O PIN BANDWIDTH TO INPUT CONTROL SIGNALS OR OUTPUT STATUS INFORMATION

BACKGROUND OF THE INVENTION

1. Field of the Invention

The present invention generally relates to electrical interfaces with input/output (I/O) ports of circuits implemented in an integrated circuit (IC) chip and, more particularly, to a technique for reducing the number of pins required for electrical interfaces to and from a chip while still maintaining the number of I/O ports for the chip.

2. Background Description

The number of pins is a primary factor in determining the physical dimensions of the chip and the number of I/O ports which may be accommodated. Many chips are I/O limited; that is, there are more I/O ports than there are available pins, given a certain maximum chip size. In order to fit on the smallest chip size possible, and be cost competitive, some way of reducing the number of pins required for chip I/Os is needed.

One technique known in the prior art for minimizing the number of pins yet providing the required interconnections to the chip I/Os is to multiplex a limited number of pins. Using this technique, a limited number of pins are used for interfacing to a greater number of I/O ports within the chip. One or more pins are used to input a selection code to a multiplexer/demultiplexer on the chip which routes connections between the I/O ports and the pins according to the selection code. This approach, however, while limiting the number of pins has several drawbacks. First, the on-chip multiplexer/demultiplexer requires a considerable amount of valuable chip real estate and can be quite complex, adding to the cost of the chip. Second, the process of multiplexing and demultiplexing slows data through put, degrading performance of the chip.

There are some chips having specialized functions that require fast data through put but need to be made as small and inexpensively as possible, including limiting the number of pins for the chip. One such chip is a parallel to serial converter. What is needed is a way to minimize the number of pins without adversely affecting the data through put and the necessity of a complex multiplexer/demultiplexer on the chip.

SUMMARY OF THE INVENTION

It is therefore an object of the present invention to provide a way to reduce the number of pins while still maintaining the number I/O ports, thereby allowing the chip dimensions to be advantageously reduced.

According to the invention, a solution is provided which takes advantage of the excess bandwidth on some of the I/Os on the chip in order to eliminate the need for dedicated I/O pins for some of the other signals required by the chip. An example of one such chip having excess bandwidth is a parallel-to-serial and a serial-to-parallel converter where the parallel data rate is higher than the serial data rate. In these chips, a normally idle time slot is used to input control and status information, thereby minimizing the number of pins required.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
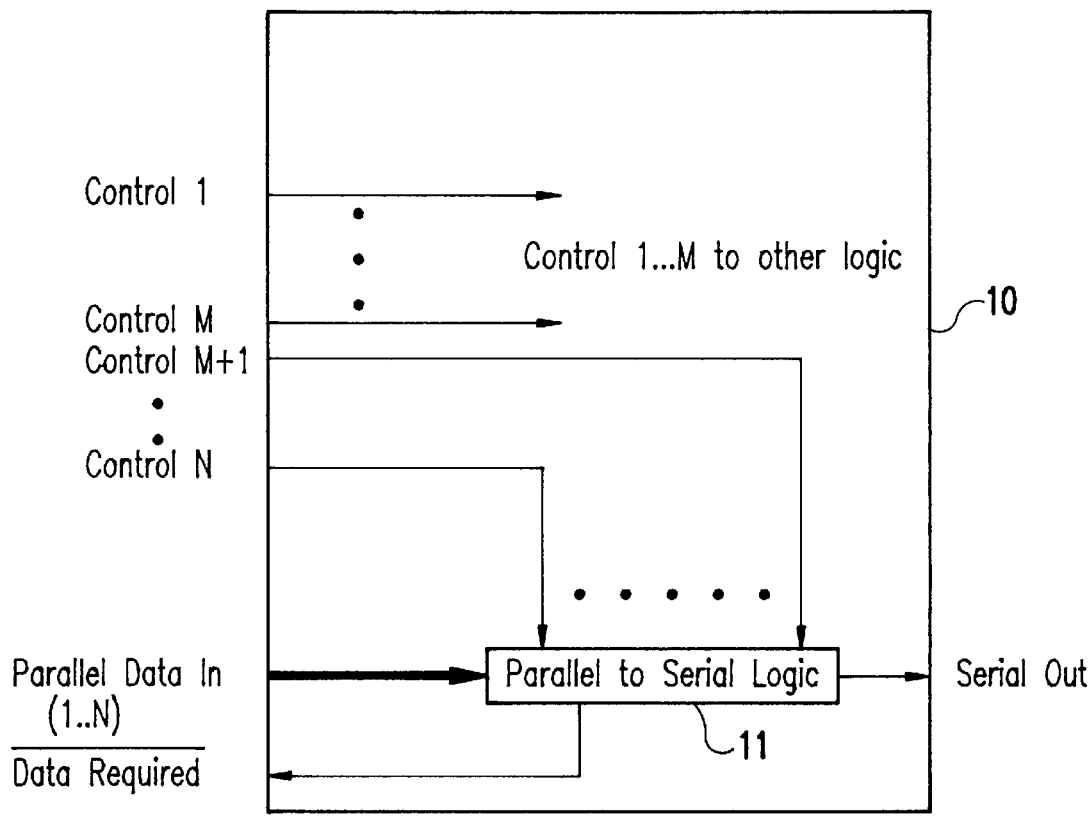
FIG. 1 is a block diagram showing the input side of a standard pin interface.

Referring now to the drawings, and more particularly to FIG. 1, there is shown the input side of a standard pin interface. The specific integrated circuit (IC) chip 10 shown supports parallel-to-serial conversion of input data, wherein the parallel input data is carried by N pins of the chip and the serial output data is carried by one pin. In addition, the chip must service N lines of control information and output a data required signal. On the left side of the chip in FIG. 1 are 2N+1 input/output (I/O) pins, N pins for control information, N pins for parallel data input, and one pin for the data required signal. On the right side of the chip is a single serial output pin. It will be understood by those skilled in the art that the chip has other pins, not shown, for making the requisite connections to a voltage supply, circuit ground and the like. These pins are dictated by the circuit design and cannot be reduced in number.

The function of the chip in this example is to convert an incoming parallel data stream into an outgoing serial data stream, and this is accomplished by the parallel-to-serial logic 11. The parallel-to-serial logic 11 is a complex functional block which takes in parallel data and converts it to a serial data stream. Many control signals are required by this logic for selection of conversion speed, encoding options and other features that are selectable by the user of the chip. The parallel-to-serial logic outputs a data required signal on pin 12 when it is ready to accept the next block of parallel data. The rate at which the parallel-to-serial logic requires parallel data is variable and not predictable. Therefore, the speed of the parallel interface must be faster than the nominal rate at which the parallel-to-serial logic 11 requires data (e.g., 50 MB/s versus 40 and 20 MB/s). This results in some unused bandwidth in the parallel interface.

Figure 1A:
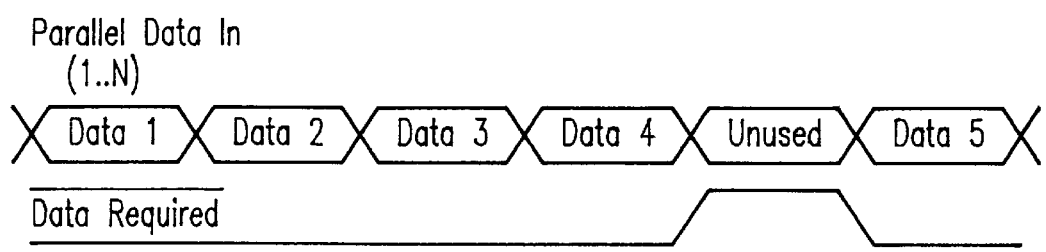
FIG. 1A is a timing diagram showing the operation of the standard pin interface of FIG. 1.

Along with the parallel and serial interfaces, several signals are required to control the various modes of the chip and to report the status of the chip. The difference in data rates means that some of the time on the parallel interface is not needed to transport data. For instance, when the parallel interface is running at 50 MB/s and the serial interface is at 40 MB/s, 20 ns out of every 100 ns on the parallel interface is not needed to supply data for the serial interface, as shown in the timing diagram of FIG. 1A.

Figure 2:
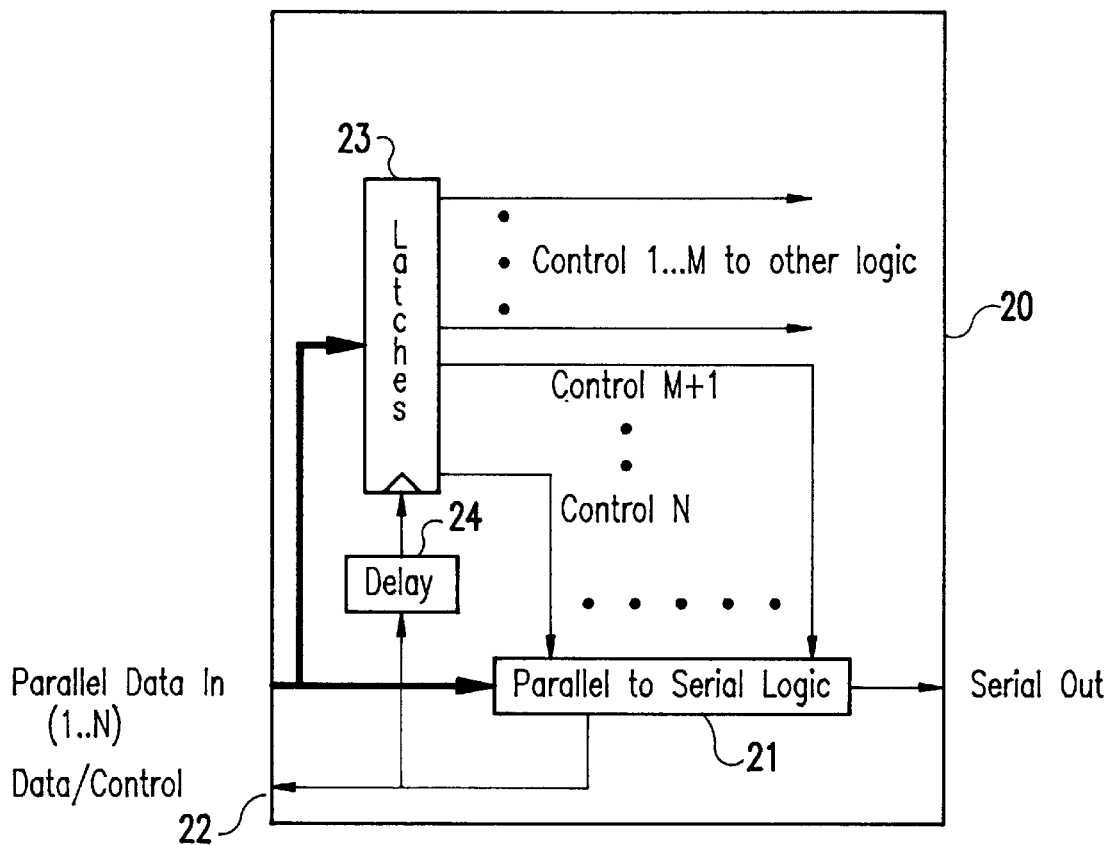
FIG. 2 is a block diagram showing the input side of the reduced pin interface according to the invention.
Figure 2A:
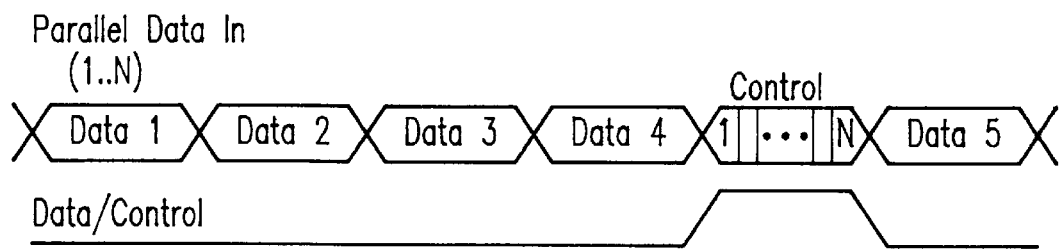
FIG. 2A is a timing diagram showing the operation of the reduced pin interface of FIG. 2.

The invention reduces the number of chip I/O pins by using this 20 ns time slot to communicate chip control and status information. As shown in FIG. 2, one I/O pin 22 of the chip 20 is used to output a select signal used to designate whether the parallel interface should input data or control information. This select signal is generated by the parallel-to-serial interface. Each control I/O is reassigned to one of the N parallel interface pins, thus reducing the number of I/O pins required by the number of parallel interface bits. The control information is carried in the normally unused 20 ns time slot as shown in FIG. 2A.

More specifically, on cycles when data is not required by the parallel-to-serial logic 21, the control signals are placed on the parallel bus and latched into control latches 23 on the chip in response to the select signal. The delay 24 is needed to delay the latching of the control signals until they are present on the parallel bus. The reduced pin interface eliminates the need for the N control lines.

Note that the control signals do not necessarily have to be related to the parallel-to-serial logic 21. Control signals to other logic on the chip can be handled as well, such as serial-to-parallel logic, speed and decoding controls.

Figure 3:
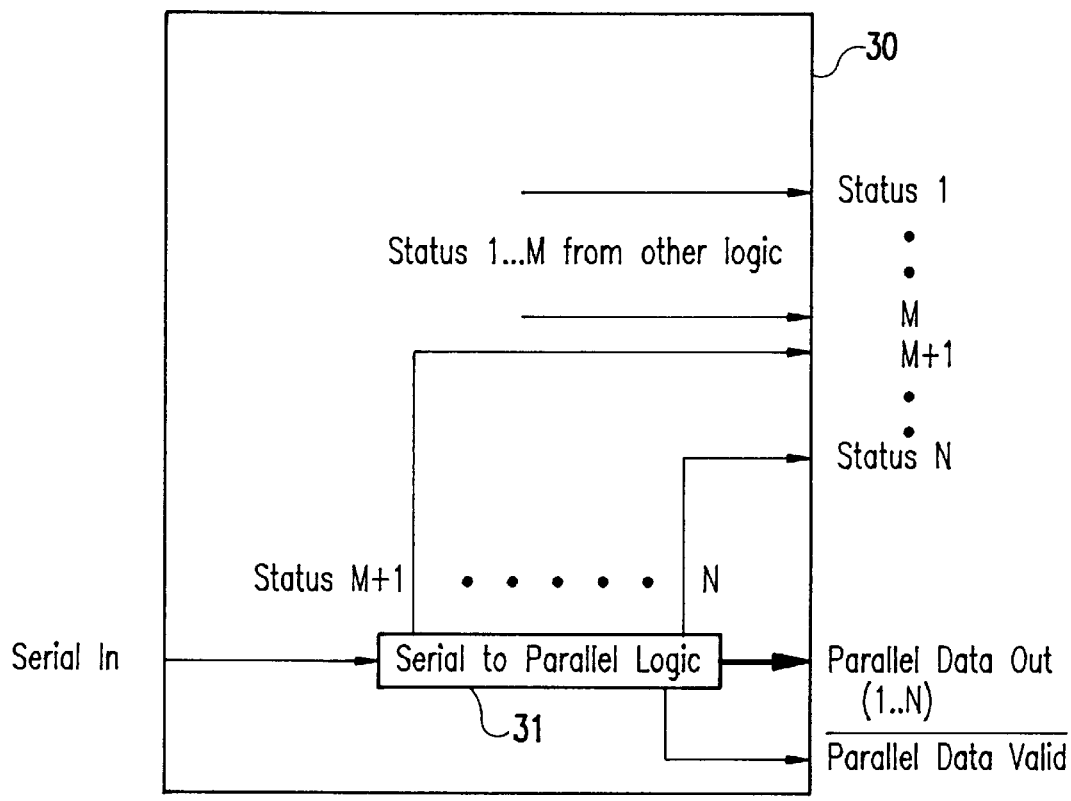
FIG. 3 is a block diagram showing the output side of a standard pin interface.
Figure 3A:
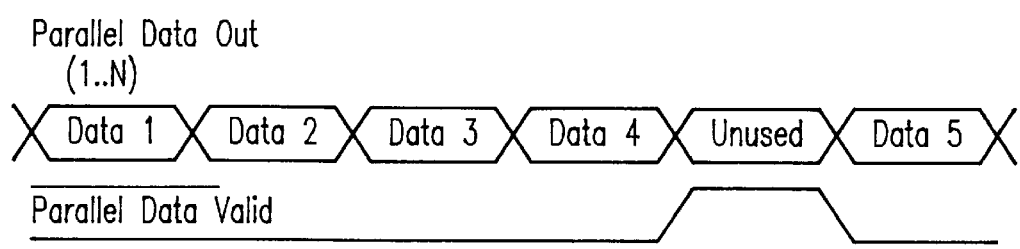
FIG. 3A is a timing diagram showing the operation of the standard pin interface of FIG. 3.

FIG. 3 shows the output side of the standard pin interface. The serial-to-parallel logic 31 is a complex logic block that receives the serial data stream and converts it for transmission over a parallel interface. While this conversion is going on, status signals are generated such as code violations, synchronization lost/found, all zeros/ones in the stream, etc. This status information is sent off the chip 30 via dedicated chip I/O pins. In addition, a parallel data valid signal from serial-to-parallel logic 31 is output via pin 32. The data conversion rate is variable and not necessarily predictable. Therefore, the parallel interface must be able to operate at a faster rate than the nominal conversion rate. This again results in some unused bandwidth on the parallel interface as shown in FIG. 3A.

Figure 4:
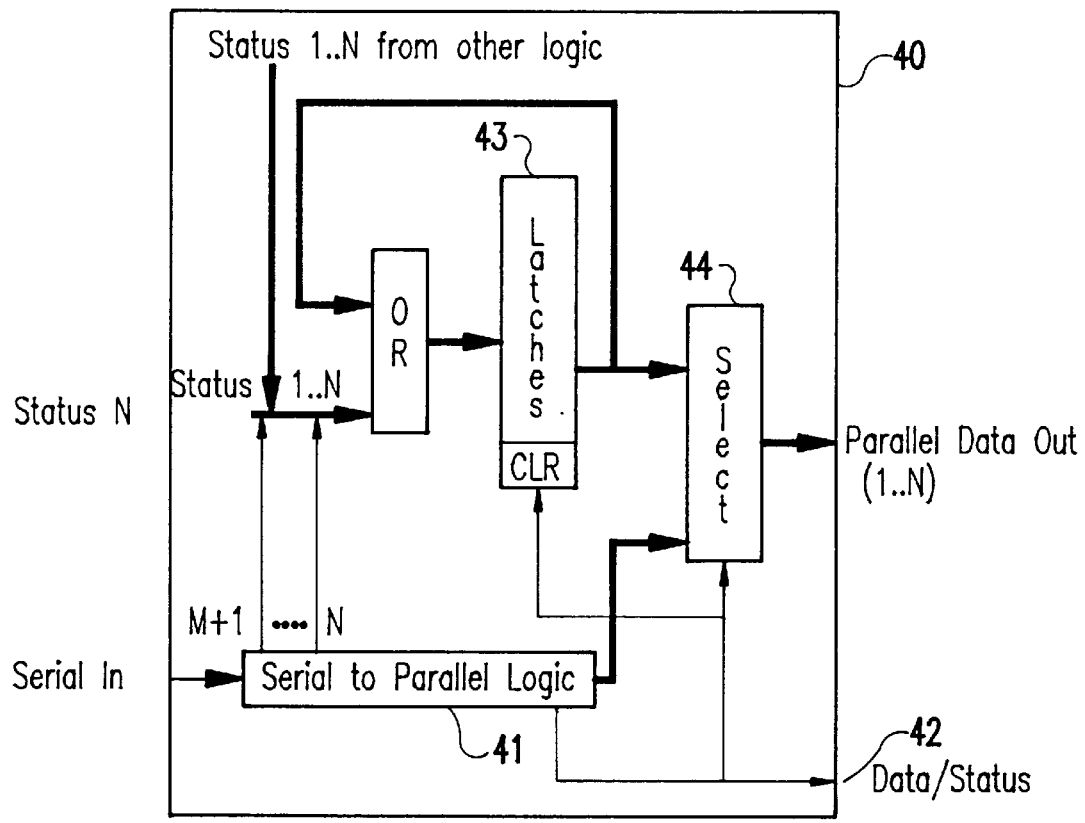
FIG. 4 is a block diagram showing the output side of the reduced pin interface according to the invention.
Figure 4A:
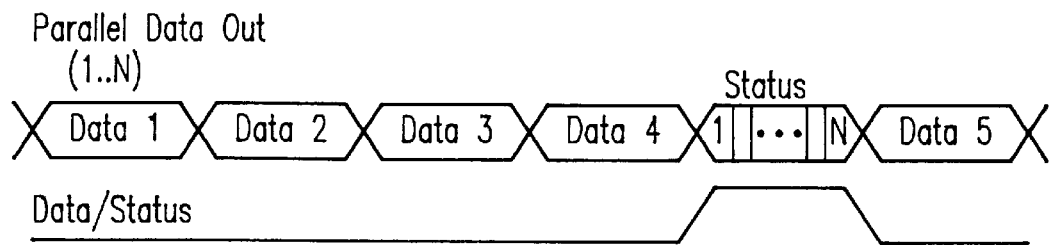
FIG. 4A is a timing diagram showing the operation of the reduced pin interface of FIG. 4.

FIG. 4 shows the output side of the reduced pin interface according to the invention. As shown in FIG. 4A, the unused time slots in the parallel bus are used to communicate the status information. The serial-to-parallel logic 41 outputs a select signal on I/O pin 42 to identify whether the output is parallel data or status information. The status signals from the serial-to-parallel logic 41 are latched in latches 43 and stored until the next unused time slot. Then they are sent on the parallel bus via the select logic 44 and the latches 43 are cleared in response to the select signal from the serial-to-parallel logic 41. Therefore, the status transmitted indicates any status event that occurred since the previous status slot. The reduced pin interface eliminates the need for the N status I/O pins.

Note that the status information does not necessarily have to come form the serial-to-parallel logic block 41. Status signals from other logic on the chip can be transmitted too, such as status from the parallel-to-serial logic shown in FIG. 2.

The invention has been described in terms of specific embodiments related to parallel-to-serial and serial-to-parallel conversion of data. It will be understood by those skilled in the art that other logic may be used in a specific implementation and, further, that the reduced pin chip input interface of FIG. 2 and the reduced pin chip output interface of FIG. 4 can be implemented in the same chip. Thus, while the invention has been described in terms of two preferred embodiments, those skilled in the art will recognize that the invention can be practiced with modification within the spirit and scope of the appended claims.

Having thus described our invention, what we claim as new and desire to secure by Letters Patent is as follows:

1. A reduced pin chip input interface for an integrated circuit comprising:

a plurality of input pins for inputting alternatively data and control signals;

logic connected to said plurality of input pins for receiving and processing data, said plurality of input pins having an input bandwidth larger than a bandwidth at which said logic requires said data;

a plurality of latches connected to said plurality of input pins for receiving and latching control signals; and a data/control pin for outputting a select signal generated by said logic and designating whether said plurality of input pins should receive data or control signals, said select signal controlling said latches to receive and latch control signals, and said select signal occurring during a normally unused data time slot, wherein the need for dedicated I/O pins is eliminated for at least one other signal required by the chip.

2. The reduced pin chip input interface recited in claim 1 wherein said logic is parallel-to-serial logic.

3. A reduced pin chip output interface for an integrated circuit comprising:

a plurality of output pins for outputting alternatively data and status signals;

a selector connected to said plurality of output pins, said selector having first and second inputs;

logic connected to said first input of said selector for outputting processed data, said plurality of output pins having an output bandwidth larger than a bandwidth at which said logic requires data;

a plurality of latches connected to said second input of said selector for latching and outputting status signals; and a data/status pin for outputting a select signal generated by said logic and designating whether said plurality of output pins is carrying data or status signals, said select signal controlling said selector to output data from said logic and status information from said latches and to reset said latches, and said select signal occurring during a normally unused data time slot, wherein the need for dedicated I/O pins is eliminated for at least one other signal required by the chip.

4. The reduced pin chip output interface recited in claim 3 wherein said logic is serial-to-parallel logic.

5. A reduced pin chip interface for an integrated circuit comprising:

a plurality of input pins for inputting alternatively data and control signals;

first logic connected to said plurality of input pins for receiving and processing data, said plurality of input pins having an input bandwidth larger than a bandwidth at which said first logic requires said data;

a first plurality of latches connected to said plurality of input pins for receiving and latching control signals;

a data/control pin for outputting a select signal generated by said first logic and designating whether said plurality of input pins should receive data or control signals, said select signal controlling said first plurality of latches to receive and latch control signals, and said select signal occurring during a normally unused data time slot;

signals;

a selector connected to said plurality of output pins, said selector having first and second inputs;

second logic connected to said first input of said selector for outputting processed data, said plurality of output pins having an output bandwidth larger than a bandwidth at which said second logic requires data;

a second plurality of latches connected to said second input of said selector for latching and outputting status signals; and a data/status pin for outputting a select signal generated by said logic and designating whether said plurality of output pins is carrying data or status signals, said select signal controlling said selector to output data from said logic and status signals from said latches and to reset said latches, and said select signal occurring during a normally unused data time slot, whereby the need for dedicated I/O pins is eliminated for at least one other signal required by the chip.

6. The reduced pin chip interface as recited in claim 5 wherein said first logic is parallel-to-serial logic and said second logic is serial-to-parallel logic.

7. An integrated circuit chip including an integrated circuit having a reduced pin chip input interface as in claim 1.

8. An integrated circuit chip including an integrated circuit having a reduced pin chip input interface as in claim 3.

9. An integrated circuit chip including an integrated circuit having a reduced pin chip input interface as in claim 5.

10. The reduced pin chip interface of claim 1 wherein the control signals are required by said logic for the selection of conversion speed.

11. The reduced pin chip interface of claim 1 wherein the control signals are required by said logic for encoding options.

12. The reduced pin chip interface of claim 3 wherein the control signals report the status of the chip.

* * * * *